United States Patent
Ohsuge

(10) Patent No.: US 7,272,131 B2
(45) Date of Patent: Sep. 18, 2007

(54) TFCI DECODING CIRCUIT AND DECODING METHOD

(75) Inventor: Michihiro Ohsuge, Tokyo (JP)

(73) Assignee: NEC Corporation, Tokyo (JP)

(*) Notice: Subject to any disclaimer, the term of this patent is extended or adjusted under 35 U.S.C. 154(b) by 845 days.

(21) Appl. No.: 10/449,925

(22) Filed: May 30, 2003

(65) Prior Publication Data

US 2003/0223399 A1    Dec. 4, 2003

(51) Int. Cl.
H04B 7/216    (2006.01)

(52) U.S. Cl. ........................ 370/342; 370/335

(58) Field of Classification Search ............ 370/342, 370/355, 343, 335; 455/434, 421
See application file for complete search history.

(56) References Cited

U.S. PATENT DOCUMENTS

| | | | |
|---|---|---|---|
| 6,985,726 B2 * | 1/2006 | Ahmed et al. ........... | 455/432.2 |
| 7,068,638 B2 * | 6/2006 | Choi et al. .................. | 370/342 |
| 7,130,352 B2 * | 10/2006 | Shimizu ..................... | 375/260 |
| 2003/0117989 A1 * | 6/2003 | Kim ........................... | 370/342 |

FOREIGN PATENT DOCUMENTS

| EP | 1 009 174 A3 | 5/2001 |
|---|---|---|
| EP | 1 286 489 A3 | 4/2003 |
| EP | 1 359 783 A1 | 11/2003 |
| JP | 2002-026735 | 1/2002 |

OTHER PUBLICATIONS

United Kingdom Examination Report dated Apr. 28, 2005.

* cited by examiner

*Primary Examiner*—CongVan Tran
(74) *Attorney, Agent, or Firm*—Scully, Scott, Murphy & Presser, P.C.

(57) ABSTRACT

The present invention provides a TFCI decoding circuit and decoding method in which the TFI information for a relevant transport channel is determined, employing all the TFCI codeword information within the TTI, to enhance the receiving performance.

A TTI combination pattern generating unit generates as a TTI combination pattern all the possible combinations of TFCI within a TTI having the longest interval among the TTIs for a plurality of transport channels, based on the fact that the TFI of a certain transport channel is not changed within the TTI on the transport channel. An adder adds, for each pattern, the likelihood for each radio frame calculated by a likelihood calculating unit, based on the TTI combination patterns. A TFI determination unit determines the TFI number of a relevant transport channel by selecting a pattern having the highest likelihood from among the TTI combination patterns.

8 Claims, 11 Drawing Sheets

FIG. 2

| TFCI COMBINATION SYMBOL | TFCI (NUMBER) | | TRANSPORT CHANNEL 1 TFT (NUMBER) TTI=20ms | | TRANSPORT CHANNEL 2 TFT (NUMBER) TTI=10ms | |
|---|---|---|---|---|---|---|
| | FRAME 1 | FRAME 2 | FRAME 1 | FRAME 2 | FRAME 1 | FRAME 2 |
| A | 0 | 0 | 0 | 0 | 0 | 0 |
| B | 1 | 1 | 1 | 1 | 0 | 0 |
| C | 0 | 2 | 0 | 0 | 0 | 1 |
| D | 1 | 3 | 1 | 1 | 0 | 1 |
| E | 2 | 0 | 1 | 0 | 1 | 0 |
| F | 3 | 1 | 0 | 0 | 1 | 0 |
| G | 2 | 2 | 0 | 1 | 1 | 1 |
| H | 3 | 3 | 1 | 1 | 1 | 1 |

FIG. 3

| TFCI (COMBINATION SYMBOL) | A (TFI1=0) | B (TFI1=1) | C (TFI1=0) | D (TFI1=1) | E (TFI1=0) | F (TFI1=1) | G (TFI1=0) | H (TFI1=1) |
|---|---|---|---|---|---|---|---|---|
| A (TFI1=0) | 0  | 32 | 16 | 32 | 16 | 32 | 32 | 32 |
| B (TFI1=1) | 32 | 0  | 32 | 16 | 32 | 16 | 32 | 32 |
| C (TFI1=0) | 16 | 32 | 0  | 32 | 32 | 32 | 16 | 32 |
| D (TFI1=1) | 32 | 16 | 32 | 0  | 32 | 32 | 32 | 16 |
| E (TFI1=0) | 16 | 32 | 32 | 32 | 0  | 32 | 16 | 32 |
| F (TFI1=1) | 32 | 16 | 32 | 32 | 32 | 0  | 32 | 16 |
| G (TFI1=0) | 32 | 32 | 16 | 32 | 16 | 32 | 0  | 32 |
| H (TFI1=1) | 32 | 32 | 32 | 16 | 32 | 16 | 32 | 0  |

TFI1 : TFI (NUMBER) OF TRANSPORT CHANNEL 1

LIKELIHOOD IN THE
FIRST FRAME

| TFCI | LIKELIHOOD |
|---|---|
| 0 | 0 |
| 1 | 16 |
| 2 | 16 |
| 3 | 16 |

LIKELIHOOD IN THE
SECOND FRAME

| TFCI | LIKELIHOOD |
|---|---|
| 0 | 16 |
| 1 | 16 |
| 2 | 0 |
| 3 | 16 |

FIG. 6

| TFCI COMBINATION SYMBOL | TFCI (NUMBER) | | LIKELIHOOD |
|---|---|---|---|
| | FRAME 1 | FRAME 2 | |
| A | 0 | 0 | 16 |
| B | 1 | 1 | 32 |
| C | 0 | 2 | 0 |
| D | 1 | 3 | 32 |
| E | 2 | 0 | 16 |
| F | 3 | 1 | 32 |
| G | 2 | 2 | 16 |
| H | 3 | 3 | 32 |

FIG. 8A

LIKELIHOOD IN THE FIRST FRAME

| TFCI | LIKELIHOOD |
|---|---|
| 0 | 1 |
| 1 | 18 |
| 2 | 15 |
| 3 | 17 |

FIG. 8B

LIKELIHOOD IN THE SECOND FRAME

| TFCI | LIKELIHOOD |
|---|---|
| 0 | 14 |
| 1 | 18 |
| 2 | 1 |
| 3 | 15 |

FIG. 9

| TFCI COMBINATION SYMBOL | TFCI (NUMBER) | | LIKELIHOOD |
|---|---|---|---|
| | FRAME 1 | FRAME 2 | |
| A | 0 | 0 | 15 |
| C | 0 | 2 | 2 |
| F | 3 | 1 | 35 |
| H | 3 | 3 | 32 |

FIG. 10

| TFCI (NUMBER) | TRANSPORT CHANNEL 1 TFI (NUMBER) | TRANSPORT CHANNEL 2 TFI (NUMBER) |
|---|---|---|
| 0 | 0 | 0 |
| 1 | 1 | 0 |
| 2 | 0 | 1 |
| 3 | 1 | 1 |

FIG. 11

| TFCI (NUMBER) | TFCI CODEWORD (32 BITS) |
|---|---|
| 0 | 0000 0000 0000 0000 0000 0000 0000 0000 |
| 1 | 1010 1010 1010 1011 0101 0101 0101 0100 |
| 2 | 0110 0110 0110 0110 1100 1100 1100 1100 |
| 3 | 1100 1100 1100 1101 1001 1001 1001 1000 |

FIG. 12

| TFCI (NUMBER) | 0 | 1 | 2 | 3 |
|---|---|---|---|---|
| 0 | 0 | 16 | 16 | 16 |
| 1 | 16 | 0 | 16 | 16 |
| 2 | 16 | 16 | 0 | 16 |
| 3 | 16 | 16 | 16 | 0 |

TFCI DECODING CIRCUIT AND DECODING METHOD

BACKGROUND OF THE INVENTION

1. Field of the Invention

The present invention relates to a TFCI decoding circuit and decoding method for decoding a TFCI (Transport Format Combination Indicator) codeword that is defined in the 3GPP (3rd Generation Partnership Project) as the third generation mobile communication system standard, and determining a TFI (Transport Format Indicator).

2. Description of the Prior Art

At present, in a communication system for portable telephones, a method for transmitting the information for a plurality of services with voice or packet multiplexed at multiple transmission rates within the same radio frame has been put into practical use. As means for indicating the content of multiplexed information or the information rate, a method for adding an information bit called a TFCI (Transport Format Combination Indicator) is provided and adopted in the 3GPP (3rd Generation Partnership Project) to create the third generation mobile communication system standard.

In accordance with the 3GPP standard, different services with packet or voice are allocated to a channel called a transport channel, and the data is encoded in a unit of transmission time called a TTI (Transmission Time Interval) for each transport channel, multiplexed into a physical channel (radio frame) and transmitted. Herein, the data amount per TTI on each transport channel can be judged based on an index called a TFI (Transport Format Indicator), in which the information called the TFCI represents a combination of TFIs on the multiplexed transport channel. Hence, if the TFCI is not normally received, the transmission rate for all the transport channels that are multiplexed can not be judged to disable the communication. Therefore, means for determining the TFCI at a low error rate is important. A relationship between the TFCI and the TFI is shown in FIG. 10.

FIG. 10 shows an example in which two transport channels 1 and 2 are multiplexed and the number of TFIs is 2. In this case, the TFCI has four combinations of TFIs.

One example of the conventional TFCI decoding circuit is described in Japanese Patent Laid-Open No. 2002-026735. The TFCI is converted into a TFCI codeword, and transmitted on a radio circuit. This TFCI codeword has a redundant bit length to withstand an error, whereby various methods for detecting and decoding the TFCI have been proposed. A relationship between the TFCI and the TFCI codeword is shown in FIG. 11. In this example of FIG. 11, the Hamming distance between the four codewords is about 16, with an equal error probability for other codewords is equal, as shown in FIG. 12.

However, there was a following problem with the prior art. In the 3GPP standard, TTI is different for each transport channel, whereby there is the possibility that the TFCI codeword is changed in a unit of minimum TTI. Therefore, in the conventional TFCI decoding circuit, the TFCI codeword was decoded in a unit of minimum TTI. For example, when the TTI is equal to 40 ms for all the transport channels, the TFCI codeword for each radio frame of 10 ms is added in common mode for four frames, whereby the signal-to-noise ratio is improved four times, with a lower error rate, as shown in FIG. 13. However, when a transport channel with TTI=20 ms and a transport channel with TTI=10 ms are multiplexed, as shown in FIG. 14, or when a transport channel with TTI=40 ms and a transport channel with TTI=10 ms are multiplexed, as shown in FIG. 15, there is the possibility that the TFCI is changed at every 10 ms, whereby the common mode addition is disabled in the maximum TTI (40 ms in FIG. 14 and 20 ms in FIG. 15). Therefore, the TFI information to be transmitted repetitively can not be effectively utilized. If the TTI is longer, the interleave (data rearrangement) period can be lengthened, whereby the error correcting ability for the transmission data itself is improved, but no TFCI error is corrected.

The conventional TFCI decoding circuit had a problem that because the TFCI codeword in a unit of minimum TTI was only employed to determine the TFI, the receiving performance was possibly worse due to an erroneous decoding.

SUMMARY OF THE INVENTION

It is an object of the invention to provide a TFCI decoding circuit and decoding method in which the TFI information for a relevant transport channel is determined, employing all the TFCI codeword information within the TTI, to enhance the receiving performance.

In order to achieve the above object, the present invention provides a TFCI decoding circuit for decoding a TFCI codeword included in the received data series to make a determination for a TFI, comprising communication parameter saving means for saving the TTI information and the TFI information for each communication service multiplexed in a radio frame, and a TFCI-TFI conversion table representing the relationship between the TFI and the TFCI, TFCI codeword extracting means for extracting a TFCI codeword from the received data series, TFCI codeword candidate generating means for generating a candidate pattern for a plurality of kinds of TFCI codewords, based on the information from the communication parameter saving means, TTI combination pattern generating means for generating as a TTI combination pattern all the possible combinations of TFCI within a TTI having the longest interval among the TTIs for a plurality of transport channels, based on the fact that the TFI of a certain transport channel is not changed within the TTI on the transport channel, likelihood calculating means for calculating the likelihood of the candidate pattern for the plurality of kinds of TFCI codewords generated by the TFCI codeword candidate generating means and the TFCI codeword extracted by the TFCI codeword extracting means, addition means for adding, for each pattern, the likelihood for each radio frame calculated by the likelihood calculating means, based on the TTI combination patterns generated by the TTI combination pattern generating means, likelihood information saving means for saving an addition result for each TTI combination pattern in the addition means, and TFI determination means for determining the TFI number of the transport channel from the TFCI-TFI table by selecting a pattern having the highest likelihood from among the TTI combination patterns generated by the TTI combination pattern generating means, based on the likelihood information for each TTI combination pattern stored in the likelihood information saving means, and outputting the TFI result.

According to this invention, the TFI that is judged to be most likely may be determined, employing all the TFCI codewords received within the TTI. Accordingly, it is possible to reduce the probability of error and enhance the receiving performance as compared with the conventional method for determining the TFI only employing the TFCI codewords within the minimum TTI.

Also, this invention provides the TFCI decoding circuit which may further comprise candidate selecting means for selecting the upper N patterns having higher likelihood from among a plurality of TTI combination patterns having the same TFCI number in the previous frame and excluding other patterns from the candidate for the plurality of TTI combination patterns generated by the TTI combination pattern generating means in a process following the second frame within the TTI, wherein the addition means performs only the addition for the TTI combination patterns left as the candidate by the candidate selecting means.

With this invention, since the number of candidates left finally can be reduced, it is possible to reduce the amount of calculation in the case where the TTI ratio between transport channels or the number of TFIs is large.

BRIEF DESCRIPTION OF THE DRAWINGS

FIG. 2 is a table showing an example of all the possible TFCI combinations within a TTI;

FIG. 3 is a table showing an example of Hamming distance between the TFCI codewords combined within the TTI;

FIG. 6 is a table showing the likelihood information calculated for eight TFCI combinations;

FIG. 8A is a table showing the likelihood in a first frame that is obtained by the likelihood calculator 4 and FIG. 8B is a table showing the likelihood in a second frame;

FIG. 9 is a table showing the likelihood information calculated for four TFCI combinations;

FIG. 10 is a table showing an example of the relationship between the TFCI and the TFI;

FIG. 11 is a table showing an example of the relationship between the TFCI and the encoded TFCI codeword;

FIG. 12 is a table showing an example of Hamming distance between the TFCI codewords;

DETAILED DESCRIPTION OF THE PREFERRED EMBODIMENTS

The preferred embodiments of the present invention will be described below in detail with reference to the accompanying drawings.

Herein, for simplification of the explanation, an example is supposed in which two transport channels are multiplexed in a radio frame, a TFCI-TFI conversion table as shown in FIG. 10 is specified, and the TFCI codewords as shown in FIG. 11 are allocated.

FIRST EXAMPLE

Figure 1:
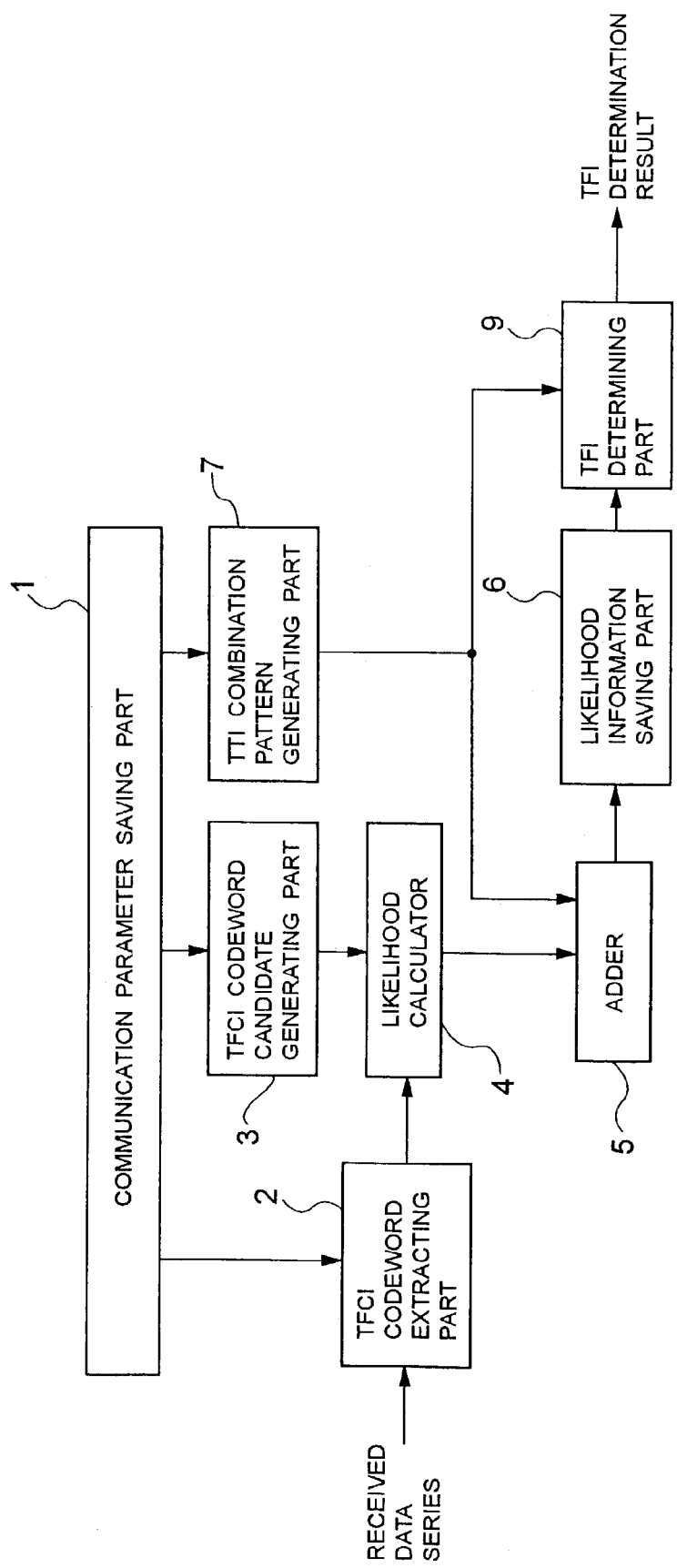
FIG. 1 is a block diagram showing the configuration of a TFCI decoding circuit according to a first embodiment of the present invention.

FIG. 1 is a block diagram showing the configuration of a TFCI decoding circuit according to a first embodiment of the present invention.

The TFCI decoding circuit of this embodiment comprises a communication parameter saving part 1, a TFCI codeword extracting part 2, a TFCI codeword candidate generating part 3, a likelihood calculator 4, an adder 5, a likelihood information saving part 6, a TTI combination pattern generating part 7, and a TFI determining part 9, as shown in FIG. 1.

The communication parameter saving part 1 saves the TTI information and TFI information for each communication service multiplexed in the radio frame and a TFCI-TFI conversion table representing the relationship between the TFI and the TFCI.

The TFCI codeword extracting part 2 extracts a TFCI codeword from the received data series. The TFCI codeword candidate generating part 3 generates candidate patterns for four kinds of TFCI codewords as shown in FIG. 11, based on the information from the communication parameter saving part 1.

The TTI combination pattern generating part 7 generates as a TTI combination pattern all the possible combinations of TFCI within a TTI having the longest interval among the TTIs for a plurality of transport channels, employing the TTI information in the communication parameter saving part 1, based on the fact that the TFI for a certain transport channel is not changed within the TTI on the transport channel.

One example of the TTI combination pattern generated by the TTI combination pattern generating part 7 is shown in FIG. 2. Herein, two transport channels are provided, and TTIs are 10 ms and 20 ms, whereby eight patterns A to H are generated as the TTI combination pattern, based on the fact that the TFI for transport channel 1 is not changed in the TTI (=20 ms) on transport channel 1, as shown in FIG. 2.

The likelihood calculator 4 calculates the likelihood of a candidate pattern for four kinds of TFCI codewords generated by the TFCI codeword candidate generating part 3 and the TFCI codeword extracted by the TFCI codeword extracting part 2.

The adder 5 adds, for each pattern, the likelihood calculated by the likelihood calculator 4 for each radio frame, based on the TTI combination pattern generated by the TTI combination pattern generating part 7, and stores it in the likelihood information saving part 6. The likelihood information saving part 6 saves the addition result for each TTI combination pattern in the adder 5.

The TFI determining part 9 determines the TFI number of relevant transport channel from the TFCI-TFI table in the communication parameter saving part 1 by selecting a pattern having the highest likelihood from among the TTI combination patterns generated by the TTI combination pattern generating part 7, based on the likelihood information for each TTI combination pattern stored in the likelihood information saving part 6, and outputs the TFI result.

Figure 14:
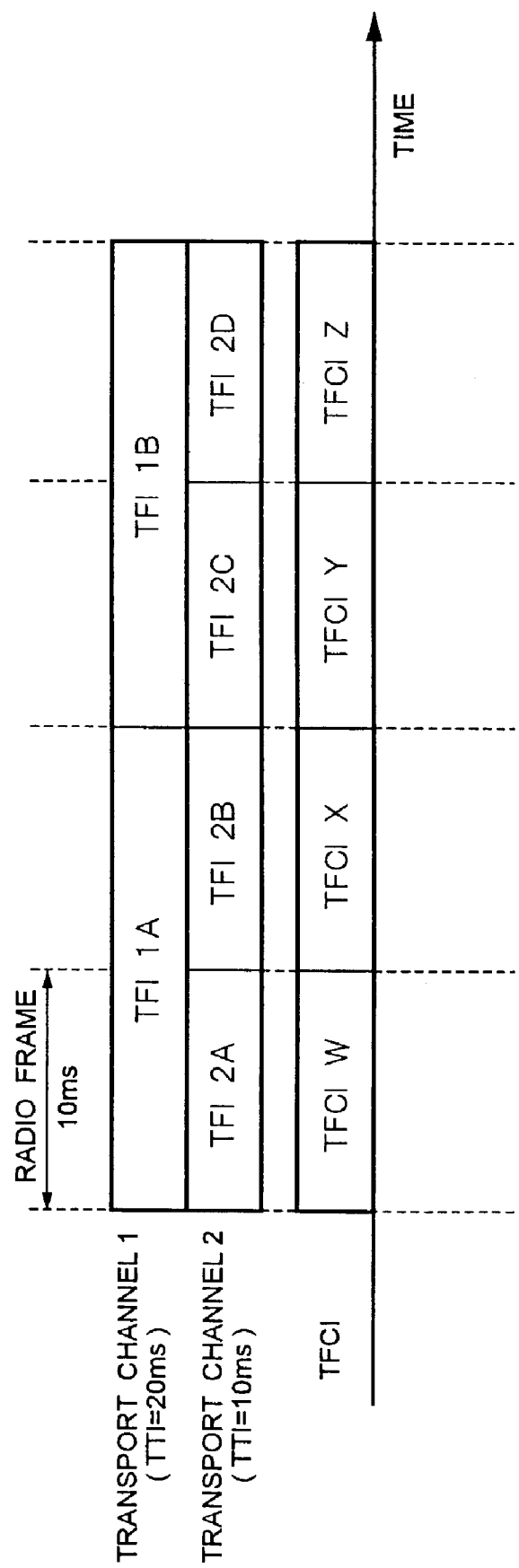
FIG. 14 is a diagram showing the relationship between the TFCI and the TFI when the transport channels in different TTIs are multiplexed.

The operation of the TFCI decoding circuit in this embodiment will be described below in detail with reference to the drawings. Herein, the operation of the TFCI decoding circuit is involved in a case where the transport channel 1 with TTI=20 ms and the transport channel 2 with TTI=10 ms are multiplexed in a radio frame, as shown in FIG. 14.

First of all, the TFCI codeword extracting part 2 extracts the 32-bit TFCI codeword alone from the received signal series within the radio frame. The encoded data of 32 bits extracted by the TFCI codeword extracting part 2 is output to the likelihood calculator 4.

Then, the TFCI codeword candidate generating part 3 generates candidate patterns for each of four kinds of 32-bit TFCI codewords as shown in FIG. 11, based on a list of candidate TFCIs designated from the communication parameter saving part 1, and the likelihood calculator 4 calculates the likelihood for each of the 32-bit TFCI codeword output from the TFCI codeword extracting part 2 and four kinds of candidate patterns. A TFCI encoding method is defined in the 3GPP as previously mentioned. Several likelihood calculating methods have been well known to those skilled in the art, and are not described here in detail. This calculation of likelihood is made for each radio frame in the same way.

If four likelihood data calculated by the likelihood calculator 4 are from the TFCI codewords in the first frame within the TTI, the adder 5 does not perform the addition for four likelihoods calculated, whereby four likelihood data from the likelihood calculator 4 are saved in the likelihood information saving part 6.

The TTI combination pattern generating part 7 generates as the TTI combination pattern all the possible combination patterns of TFCI within 20 ms as shown in FIG. 2, providing that the TFI of the relevant transport channel is not changed within the TTI.

The possible combinations when four kinds of TFCI codewords are received twice are 4×4=16 ways, but may be restricted to 8 ways, considering the fact that the TFI of transport channel 1 is the same within the TTI (20 ms).

In a processing for the second frame within the TTI, the adder 5 adds four likelihood data (second frame) output from the likelihood calculator 4 and four likelihood data (first frame) saved in the likelihood information saving part 6 in accordance with this TTI combination patterns to calculate the likelihood for each of the TTI combination patterns. Thereby, the likelihood information for each of the TFCI combinations in eight ways is obtained. Lastly, the TFI determining part 9 determines the TFI number of transport channel 1 in accordance with the combination table of FIG. 2 by selecting a TFCI combination having the highest likelihood from the TFCI combinations in eight ways, and outputs the TFI determination result.

In this embodiment, the TFI of transport channel 2 can be converted from the TFCI determination result of one radio frame, employing the TFCI-TFI conversion table of FIG. 10.

Taking a parameter used in the explanation of the operation in this embodiment for instance, the Hamming distance between the TFCI codewords combined in eight ways as the candidate is shown in FIG. 3. The Hamming distance between the codewords for which the TFI of transport channel 1 is mistaken is all 32. Also, the Hamming distance between the codewords for which the TFI of transport channel 1 is correctly detected but the TFI of transport channel 2 is mistaken once or twice is 16 or 32. Hence, in the case where the TFCI combination itself is not correctly detected (i.e., the TFCI determination for one frame is erroneous), there is a higher probability that the TFI of transport channel 1 having a longer TTI is correctly detected.

In this manner, the TFCI decoding circuit of this embodiment makes the arithmetical operation, employing all the TFCI codewords within the TTI of 20 ms, to prevent false determination for the TFI of transport channel 1, whereby the receiving performance is enhanced.

Moreover, the operation of the TFCI decoding circuit in this embodiment will be described below using some specific numbers.

In the following explanation, the Hamming distance is employed as the likelihood information. Accordingly, the smaller the value of likelihood information, the higher the likelihood. This invention is not limited to such an instance, but may be also applicable when another value or information is employed as the likelihood information.

Figures 4, 5A, 5B:
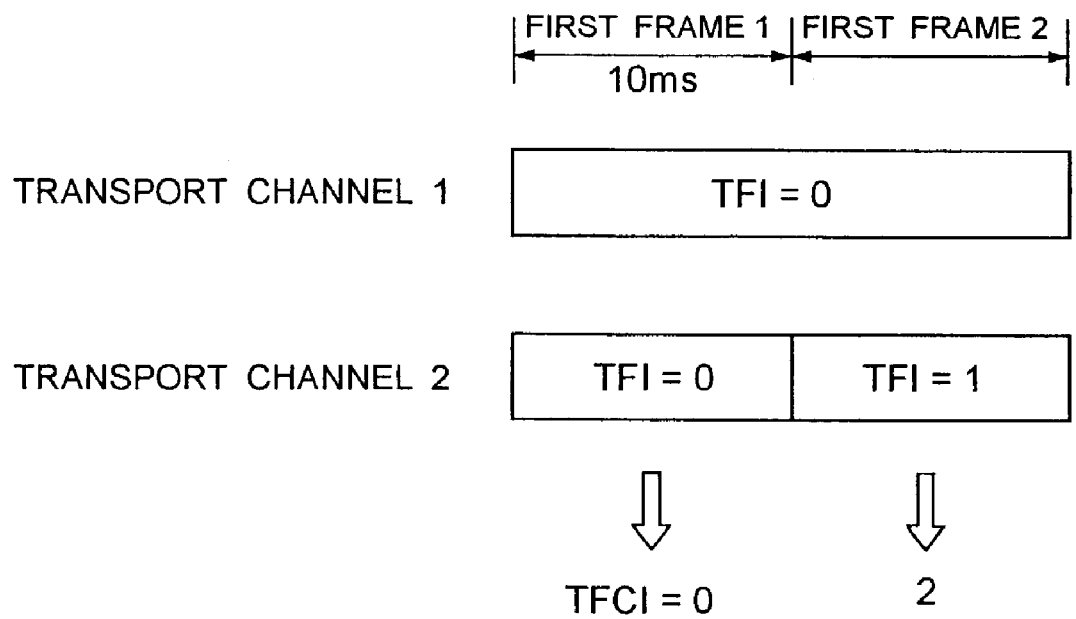
FIG. 4 is a diagram showing a specific example of the relationship between TFCI and TFI when the transport channels in different TTIs are multiplexed.
FIG. 5A is a table showing the likelihood in a first frame that is obtained by a likelihood calculator 4 and FIG. 5B is a table showing the likelihood in a second frame.

For example, it is assumed that on transport channel 1, the TFI number is "0" for the first and second frames, and on transport channel 2, the TFI number is "0" for the first frame, and "1" for second frame, as shown in FIG. 4. In this case, the TFCI for the first frame is "0" and the TFCI for the second frame is "2".

In decoding the TFCI codeword as configured in the manner, the likelihood in the first frame on transport channel 1 is ideally as shown in FIG. 5A. Also, the likelihood in the second frame is as shown in FIG. 5B. By adding these likelihood informations in the adder 5, the likelihood for each TTI combination pattern is as shown in FIG. 6. Therefore, the TFI determining part 9 determines TFCI for the first frame to be "1" and TFCI for the second frame to be "2" by selecting a TFCI combination pattern "C" having the highest likelihood. Thus, the TFI determining part 9 determines the TFI of transport channel 1 to be "0" by referring to the TFCI-TFI conversion table of FIG. 10.

SECOND EMBODIMENT

Figure 7:
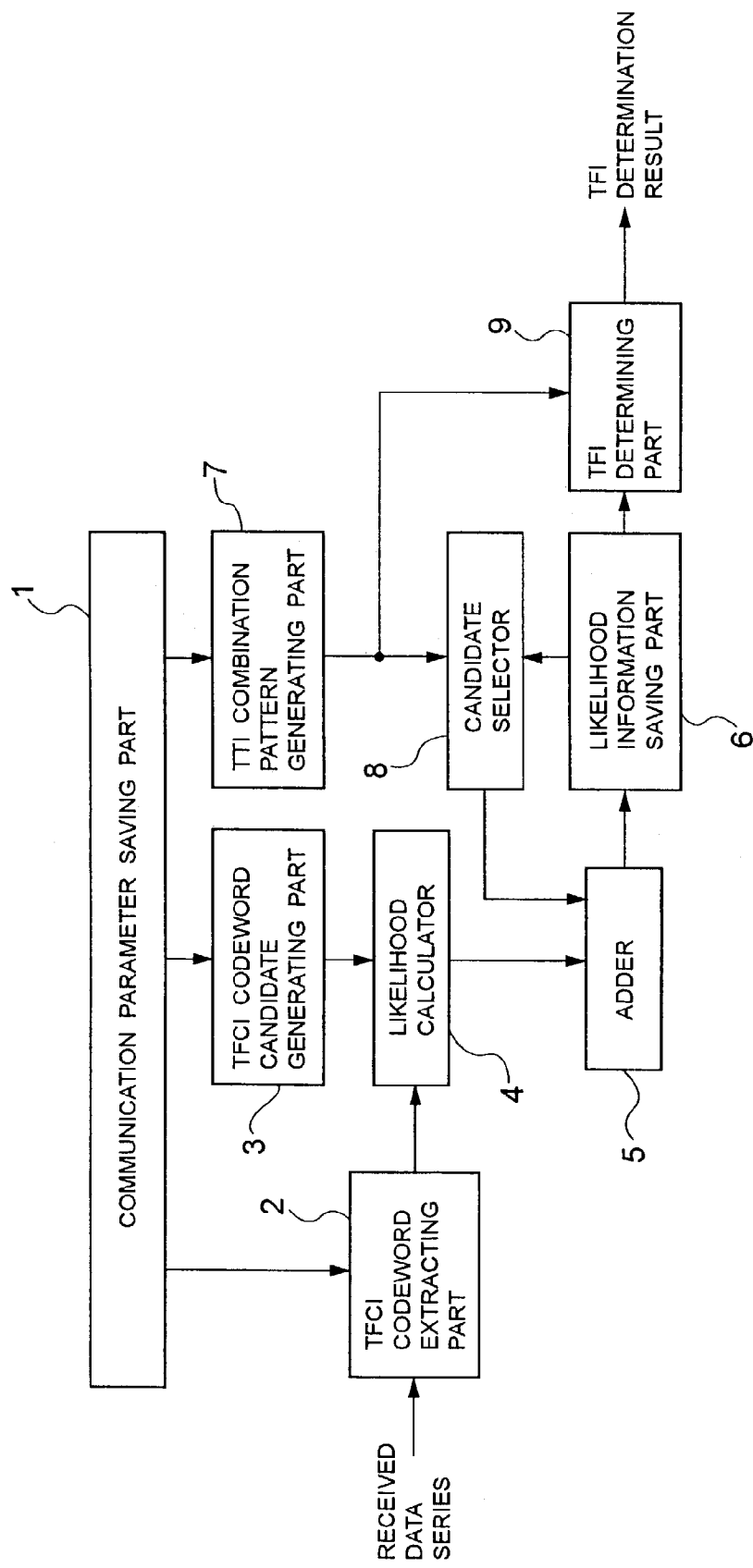
FIG. 7 is a block diagram showing the configuration of a TFCI decoding circuit according to a first embodiment of the invention.
Figure 13:
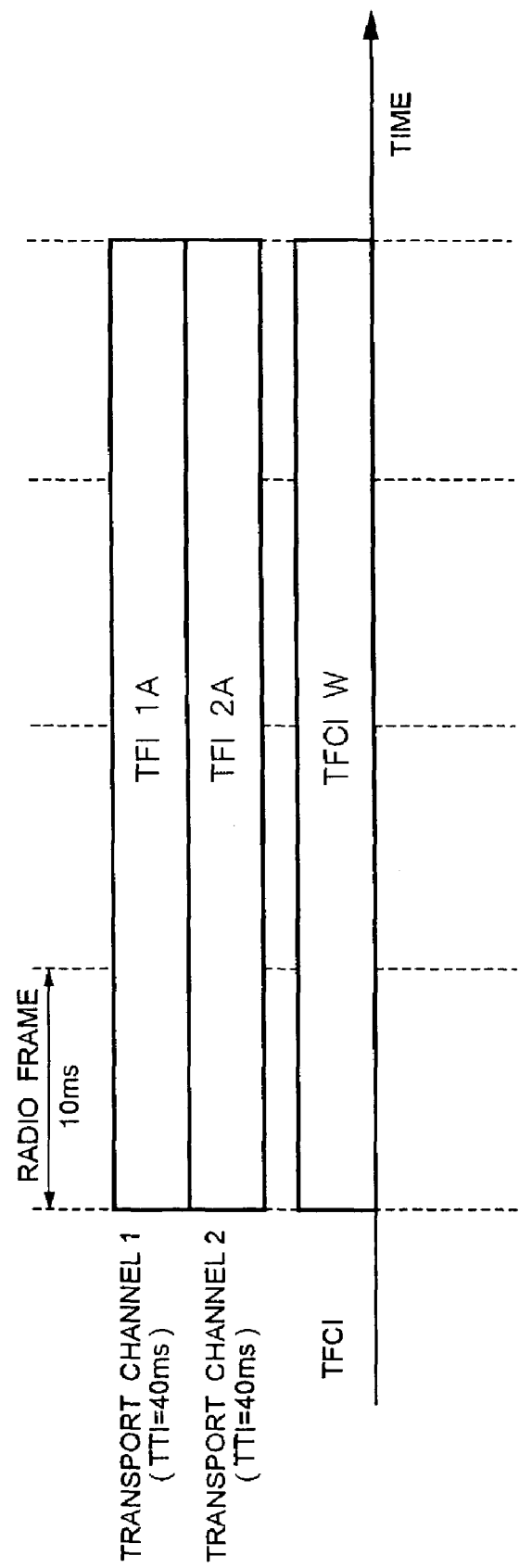
FIG. 13 is a diagram showing the relationship between the TFCI and the TFI when the transport channels in the same TTI are multiplexed.

A TFCI decoding circuit according to a second embodiment of the invention will be described below. FIG. 7 is a block diagram showing the configuration of the TFCI decoding circuit according to the second embodiment of the invention. In FIG. 7, the same or like parts are designated by the same numerals as in FIG. 1, and not described here.

The TFCI decoding circuit of this embodiment comprises a communication parameter saving part 1, a TFCI codeword extracting part 2, a TFCI codeword candidate generating part 3, a likelihood calculator 4, an adder 5, a likelihood information saving part 6, a TTI combination pattern generating part 7, a candidate selector 8 and a TFI determining part 9, as shown in FIG. 7.

The basic configuration of the TFCI decoding circuit in the second embodiment is the same as in the first embodiment, except that a candidate selecting part 8 is newly provided for the TFCI decoding circuit.

Though the TFCI decoding circuit of the first embodiment as shown in FIG. 1 makes the addition of the likelihood information for all the eight combination patterns generated by the TTI combination pattern generating part 7, the TFCI decoding circuit of the second embodiment excludes the pattern unlikely to be finally selected from the candidate, employing the likelihood information for each TTI combination pattern saved in the likelihood information saving part 6, to reduce the addition process.

The candidate selector 8 selects the upper N TTI combination patterns having higher likelihood from among the TTI combination patterns with the same TFCI number in the first frame and excludes other patterns from the candidate for the eight TTI combination patterns generated by the TTI combination pattern generating part 7 in a process following the second frame within the TTI. And the adder 5 in this embodiment does not make the addition for the TTI combination patterns excluded from the candidate by the candidate selector 8.

The operation of the TFCI decoding circuit in this embodiment under the same conditions as described above in the first embodiment will be described below. For simplification of the explanation, it is supposed in the following explanation that the candidate selector 8 leaves as the candidate an upper pattern of two patterns having the same TFCI number.

The operation of making the likelihood calculation for each radio frame in the likelihood calculator 4 is the same as for the TFCI decoding circuit in the first embodiment as shown in FIG. 1, and is not described here.

In the first frame within the TTI, four likelihood data calculated by the likelihood calculator 4 are not added by the adder 5 and saved in the likelihood information saving part 6.

Employing the likelihood information saved in the likelihood information saving part 6 in processing the first frame, the candidate selector 8 selects as the candidate a TFCI having higher likelihood of TFCI "0" and "2" in which TFI on transport channel 1 is "0" among the four candidates of TFCI as shown in FIG. 4. Likewise, it selects as the candidate a TFCI having higher likelihood of TFCI "1" and "3" in which the TFI on transport channel 1 is "1". The likelihood information in which the two candidates are combined with four likelihood data calculated in the second frame is output to the likelihood information saving part 6 again.

For example, if the likelihoods for the TFCI "0", "1", "2" and "3" are 1, 18, 15 and 17 in the first frame, respectively, as shown in FIG. 8A, the candidate selector 8 selects as the candidate the TFCI "0" having higher likelihood of the TFCIs "0" and "2" having the likelihoods "1" and "15". Likewise, the candidate selector 8 selects as the candidate the TFCI "3" having higher likelihood of the TFCIs "1" and "3" having the likelihood "18" and "17".

That is, the candidate selector 8 selects as the candidate the A, C, F and H patterns with TFCI "0" or "3" in the first frame from among the TTI combination patterns generated by the TTI combination pattern generating part 7, whereby the likelihood calculation for other patterns B, D, E and G is not performed.

If the likelihood information in the second frame have the values as shown in FIG. 8B, the likelihood for each TTI combination pattern is as shown in FIG. 9.

Thereby, the likelihood information is acquired for each of four TFCI combinations surviving in this embodiment. Finally, the TFI determining part 9 selects a combination having the highest likelihood from among the four combinations, converts the combination into the TFI number of transport channel 1 by referring to the combination table of FIG. 10, and outputs the result.

Figure 15:
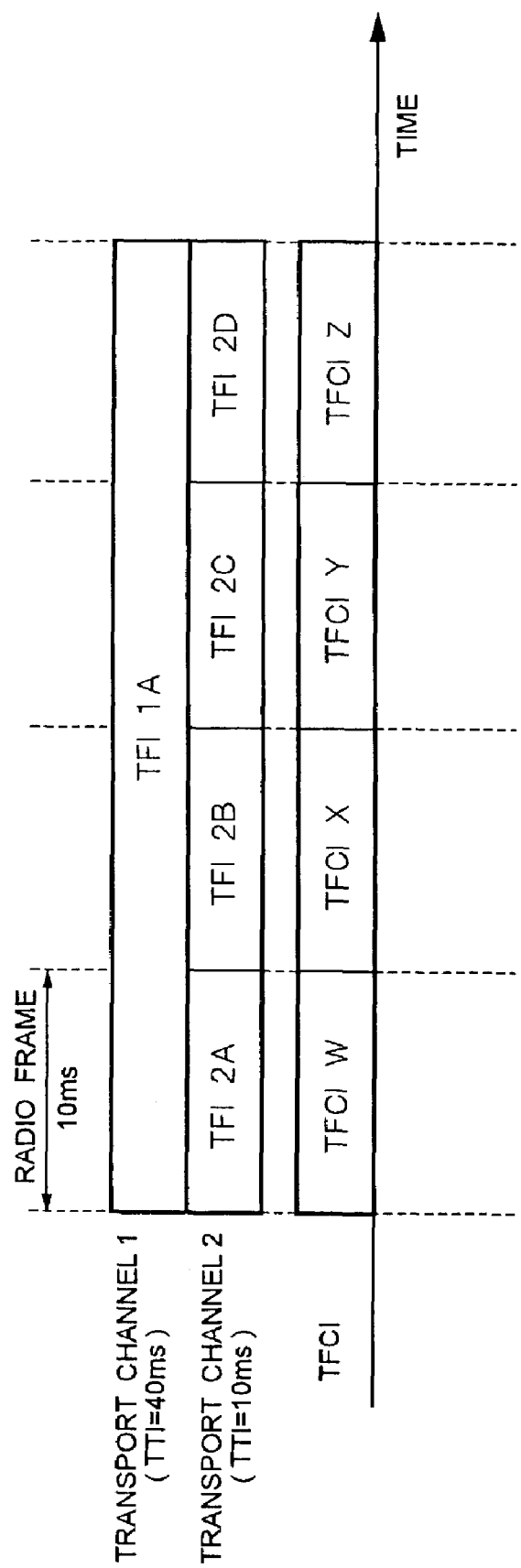
FIG. 15 is a diagram showing the relationship between the TFCI and the TFI when the transport channels in different TTIs are multiplexed.

As described above, since the number of combination candidates left finally can be reduced, this embodiment is effective for the cases where the TTI ratio between the transport channels is large as shown in FIG. 15, and the number of TFIs is too large to make the calculation in the first embodiment.

In the first and second embodiments as described above, the TFCI decoding circuit has two TFIs for simplification of the explanation. However, this invention is not limited to such a case, but may be also applicable to other cases with three or more TFIs.

Also, in the first and second embodiments as described above, the TFCI decoding circuit employs the Hamming distance as the likelihood information. However, this invention is not limited to such a case, but may be also applicable to another case of using other values as the likelihood information.

As described above, with this invention, the TFI information for the relevant transport channel is determined, employing all the TFCI codeword information within the TTI, resulting in the effect that the receiving performance is enhanced.

What is claimed is:

1. A TFCI decoding circuit for decoding a TFCI codeword included in the received data series to make a determination for a TFI, comprising:
    means for determining the TFI information of a relevant transport channel, employing all the TFCI codeword information within a TTI; and
    means for selecting the upper N patterns having a higher likelihood from among a plurality of TTI combination patterns with the same TFCI number in the previous frame in a process following the second frame within a TTL.

2. The TFCI decoding circuit according to claim 1, wherein the TFI that is judged to be most likely is determined, employing all the TFCI codeword information within said TTI.

3. A TFCI decoding circuit for decoding a TFCI codeword included in the received data series to make a determination for a TFI, comprising:
    communication parameter saving means for saving the TTI information and the TFI information for each communication service multiplexed in a radio frame, and a TFCI-TFI conversion table representing the relationship between the TFI and the TFCI;
    TFCI codeword extracting means for extracting a TFCI codeword from the received data series;
    TFCI codeword candidate generating means for generating a candidate pattern for a plurality of kinds of TFCI codewords, based on the information from said communication parameter saving means;
    TTI combination pattern generating means for generating as a TTI combination pattern all the possible combinations of TFCI within a TTI having the longest interval among the TTIs for a plurality of transport channels, based on the fact that the TFI of a certain transport channel is not changed within the TTI in said transport channel;
    likelihood calculating means for calculating the likelihood of said candidate pattern for said plurality of kinds of TFCI codewords generated by said TFCI codeword candidate generating means and said TFCI codeword extracted by said TFCI codeword extracting means;
    addition means for adding, for each pattern, the likelihood for each radio frame calculated by said likelihood calculating means, based on said TTI combination patterns generated by said TTI combination pattern generating means;
    likelihood information saving means for saving an addition result for each TTI combination pattern in said addition means; and
    TFI determination means for determining the TFI number of said transport channel from said TFCI-TFI table by selecting a pattern having the highest likelihood from among the TTI combination patterns generated by said TTI combination pattern generating means, based on the likelihood information for each TTI combination pattern stored in said likelihood information saving means, and outputting the TFI result.

4. The TFCI decoding circuit according to claim 3, further comprising candidate selecting means for selecting the upper N patterns having higher likelihood from among a plurality of TTI combination patterns having the same TFCI number in the previous frame and excluding other patterns from the candidate for the plurality of TTI combination patterns generated by said TTI combination pattern generating means in a process following the second frame within the TTI, wherein said addition means performs only the addition for the TTI combination patterns left as the candidate by said candidate selecting means.

5. A TFCI decoding method for decoding a TFCI codeword included in the received data series to make a determination for a TFI, comprising:
   a step of determining the TFI information of a relevant transport channel, employing all the TFCI codeword information within the TTI; and
   a step of selecting the upper N patterns having higher likelihood from among a plurality of TTI combination patterns having the same TFCI number in the previous frame in a process following the second frame within a TTI.

6. The TFCI decoding method according to claim 5, wherein the TFI that is judged to be most likely is determined, employing all the TFCI codeword information within said TTI.

7. A TFCI decoding method for decoding a TFCI codeword included in the received data series to make a determination for a TFI, comprising:
   a step of extracting a TFCI codeword from the received data series;
   a step of generating a candidate pattern for a plurality of kinds of TFCI codewords based on information from a communication parameter saving means;
   a step of generating as a TTI combination pattern all the possible combinations of TFCI within a TTI having the longest interval among the TTIs for a plurality of transport channels, based on the fact that the TFI of a certain transport channel is not changed within the TTI on said transport channel;
   a step of calculating the likelihood of the candidate pattern for said plurality of kinds of TFCI codewords and said TFCI codeword extracted;
   a step of adding the calculated likelihood for each radio frame for each of said TTI combination patterns; and
   a step of determining the TFI number of said transport channel from a TFCI-TFI table by selecting a pattern having the highest likelihood from among said TTI combination patterns, based on the likelihood information for each TTI combination pattern, and outputting the TFI result.

8. The TFCI decoding method according to claim 7, further comprising a step of selecting the upper N patterns having higher likelihood from among said plurality of TTI combination patterns having the same TFCI number in the previous frame and excluding other patterns from the candidate for said plurality of TTI combination patterns generated by said TTI combination pattern generating means in a process following the second frame within the TTI.

* * * * *